United States Patent [19]

Suzaki et al.

[11] 4,148,569

[45] Apr. 10, 1979

[54] LENS UNIT FOR MOTION PICTURE PROJECTOR AND OTHERS

[75] Inventors: Kuniyoshi Suzaki, Machida; Akira Ashida, Yokohama; Takashi Itani, Yokohama; Tateo Yamada, Yokohama; Masaya Maeda, Kawasaki; Kiyoshi Takahashi, Kunitachi; Hiroyuki Takimoto, Tokyo, all of Japan

[73] Assignee: Canon Kabushiki Kaisha, Tokyo, Japan

[21] Appl. No.: 826,231

[22] Filed: Aug. 19, 1977

[30] Foreign Application Priority Data

Sep. 3, 1976 [JP] Japan .................................. 51/105461

[51] Int. Cl.$^2$ .............................................. G03B 3/00
[52] U.S. Cl. .................................... 352/140; 350/78; 350/255
[58] Field of Search .................. 352/139, 140; 350/74, 350/76, 77, 78, 79, 255

[56] References Cited

U.S. PATENT DOCUMENTS 1,620,768   3/1927   Joy ....................................... 352/140

FOREIGN PATENT DOCUMENTS 976905   12/1964   United Kingdom ..................... 352/140

*Primary Examiner*—Monroe H. Hayes
*Attorney, Agent, or Firm*—Toren, McGeady and Stanger

[57] ABSTRACT

The present invention relates to a lens unit construction for motion picture and other type projectors. The unit is provided with a motion picture projecting lens construction, a mantle cover to be fixed on the fixing position of the motion picture projector body, a guide device for slidingly guiding and holding the lens construction holding device on the device plate in such a manner that the construction holding device is slidable only along the direction of the optical axis of the lens construction and an adjusting device for operating the slide motion of the construction holding device. The construction holding device or the adjusting device is provided with a cam follower pin while the other is provided with a focus adjusting cam groove in which the cam follower pin is engaged. An engaging device guides the cam follower pin so that it can be easily introduced into the cam groove at the time of assembling the construction holding device with the adjusting device to form one body and for preventing the cam follower pin from being easily brought out of the cam groove in such a manner that the construction holding device is cooperatively coupled with the adjusting device.

13 Claims, 9 Drawing Figures

LENS UNIT FOR MOTION PICTURE PROJECTOR AND OTHERS

BACKGROUND OF THE INVENTION

1. Field of the Invention

The present invention relates to a lens unit construction for a motion picture projector.

2. Description of the Prior Art

In case of almost all of the conventional motion picture projectors, the device for holding and adjusting the motion picture projection lens construction is generally designed so that the lens construction holding device for holding the lens construction adjustable along the optical axis is fixed on a part of the motion picture projector or is formed on the projector as one body. The focus adjusting member is typically provided on the mantle cover for the lens construction to be fixed on the motion picture projector body so as to cover the construction holding frame and so as to be operable from outside whereby the cam follower pin provided on the fixed external cylinder of the motion picture projecting lens construction is engaged into the cam groove for the focus adjustment provided on the adjustment member in such a manner that by operating the adjustment member the motion picture lens construction is slidably moved relative to the construction holding frame so as to adjust the focus.

In motion picture projectors designed as mentioned above the lens construction is first brought into the construction holding frame, while the cam follower pin is permitted to fall into the slide guide hole provided in the construction holding frame. The adjusting member is then mounted on the construction holding frame or the mantle cover undismountably. The top of the cam follower pin projecting out of the guide hole is caught in the cam groove. Assembly is comparatively troublesome and inefficient so that it is not suited for mass production. Production cost for such a projector are therefore high, which is not profitable.

On the other hand, it is also necessary that the operator be able to take the motion picture lens construction out of the projector body so that the operator might be able to clean the surface of the lens giving to the film or to exchange the lens. The above mentioned construction is very inconvenient for the operator to accomplish this.

SUMMARY OF THE INVENTION

One object of the present invention is to provide a projector construction which is easily assembled and suited for mass production at lower production cost, whereby the above mentioned shortcomings of the conventional projectors are eliminated.

Another object of the present invention is to provide a removable lens unit which includes a lens construction, a construction holding frame for fixedly holding the lens construction, a mantle cover for the lens construction fixed on the motion picture projector body so as to hold the construction holding frame adjustable in position along the optical axis of the above mentioned lens construction, and an adjusting means for effecting focusing adjustment provided on the mantle cover so as to be operable for adjusting the position of the construction holding frame along the above mentioned optical axis.

Yet another object of the present invention is to provide the construction of a lens unit which will facilitate the assembling of the lens unit itself. To this end the construction holding frame is provided with a cam follower, while the adjusting member is provided with a cam groove to receive the cam follower to adjust the position of the construction holding frame along the optical axis. The adjusting means also has a guide groove for introducing the cam follower into the cam groove during assembly. The guide groove is connected with the cam groove via a stepped part for facilitating the introduction of the cam follower into the cam groove and for preventing the cam follower from escaping out of the cam groove after assembly. The adjusting member is positioned between the construction holding frame and the mantle cover, while the engagement of the cam follower with the cam groove is maintained by means of an elastic member and the projector in which the lens unit is used.

A still further object of the present invention is to provide a lens unit for a motion picture projector which includes a mantle cover having a part which covers the image projection gate of the motion picture projector, so as to prevent leakage of light at the gate when the lens unit is mounted on the motion picture projector.

Another object of the present invention is to provide, a lens unit for a motion picture projector which includes a cam follower on the construction frame and which has, a cam groove on the adjusting member for cooperating with the cam follower so as to adjust the position of the construction holding frame along the optical axis. A guide groove is connected with the cam groove via a stepped part so as to facilitate the introduction of the cam follower into the cam groove at the time of the assembling of the lens unit and to prohibit the cam follower from escaping out of the cam groove after introduction into the cam groove.

Yet a further object of the present invention is to provide a lens unit which has a mantle cover provided with a guide part for guiding the construction holding frame along the optical axis, and the construction holding frame being provided with a follower part to be engaged with the guide part, so that engagement of the follower part with the guide part is maintained by means of the elastic member.

Yet another object of the present invention is to provide a lens unit for a motion picture projector having a lens construction fixed on the construction holding frame by means of an elastic member so as to be dismountable from the construction holding frame.

Further, objects of the present invention will be apparent from the explanation to be made below in accordance with the accompanying drawings of the embodiments of the present invention.

DESCRIPTION OF THE PREFERRED EMBODIMENTS

The present invention will now be explained in detail in accordance with the accompanying drawings showing the embodiments of the present invention.

Figure 1:
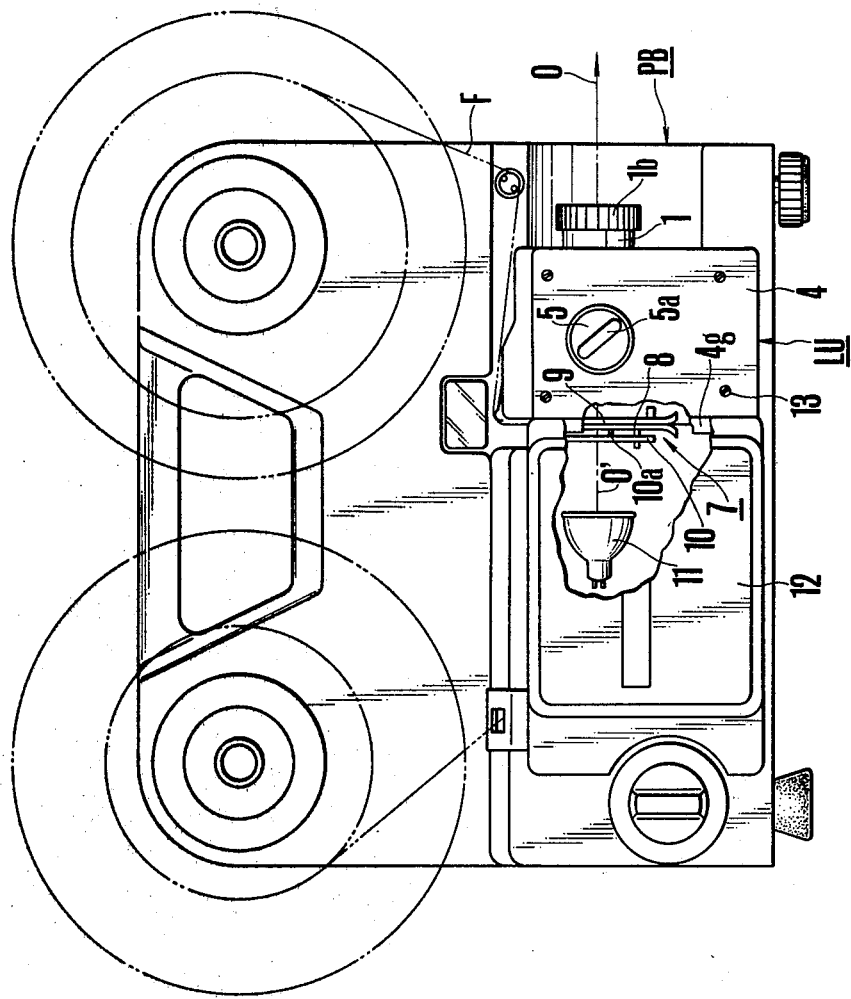
FIG. 1 is a partially broken away side elevational view of the motion picture projector in accordance with the present invention.

FIG. 1 shows the motion picture projector in accordance with the present invention, whereby PB is the motion picture projector body while LU is the lens unit to be applied to the motion picture projector in accordance with the present invention. The lens unit LU is fixed at a proper position in front of the image projecting gate part 7 of the motion picture projector PB by means of a screw. 8 is an aperture plate having an image projecting aperture, 9 is a film pressing plate for pressing the film F against the aperture plate 8 and 10 is a film intermittently feeding member having a feeding claw 10a. All the above members are provided at the above mentioned image projecting gate part 7. 11 is the projection lamp and 12 is the cover for the lamp chamber.

Figure 2:
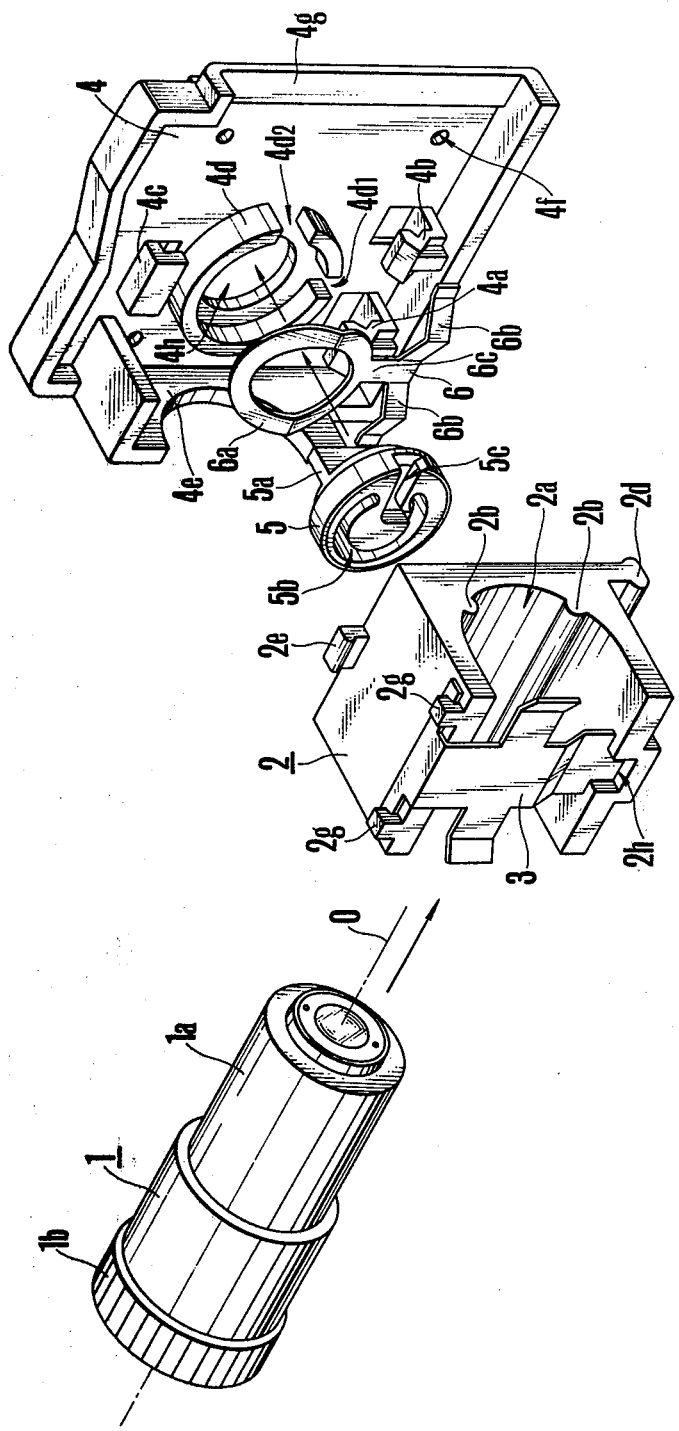
FIG. 2 is an exploded perspective view of an embodiment of the lens unit to be applied to the motion picture projector.

As seen in FIG. 2 which shows the lens unit LU in a disassembled condition, the unit includes a projection lens construction 1, a construction holding frame 2 for fixedly holding the lens construction 1 by means of a plate spring 3, a mantle cover 4 for containing the lens construction which holds the construction holding frame 2 adjustably in position along the optical axis 0 of an optical system of the lens construction 1 (namely along the projection optical axis), a plate spring 6, and an adjusting member 5 for focal adjustment to effect the positional adjustment of the construction holding frame 2 along the optical axis 0 of the optical system. By mounting the mantle cover 4 to the projector body PB by means of a screw 13, the lens unit LU and the projector body PB are fixedly connected together.

The above mentioned projection lens construction 1 presents a fixed external cylinder 1a fixedly held by means of the above mentioned construction holding frame 2 and an operation ring 1b for zooming adjustment. The above mentioned construction holding frame 2 has a U-shaped concave part 2a for receiving the fixed external cylinder 1a of the lens construction 1. Standard rails 2b for centering the lens construction 1 are formed on the internal surface of the concave part 2a so as to be parallel to the optical axis 0. Slide follower parts 2c, 2d and 2e, a cam follower 2f and an abutment 2g for mounting the plate spring 3 are formed on the outside of the construction holding frame 2 so as to be integral with the frame 2. The lens construction 1 is contained in the above mentioned concave part 2a and is centered by means of the above mentioned standard rails 2b. The lens construction therein is fixedly held by its fixed external cylinder 1a by means of the above mentioned plate spring 3.

On the above mentioned mantle cover 4, guide rails 4a, 4b and 4c for the focus adjustment are respectively engaged with the slide follower parts 2c, 2d and 2e on the above mentioned construction holding frame 2 so as to hold the construction holding frame 2 in adjustable position along the optical axis 0. Ring-shaped wall 4d supports the adjusting member 5. A circular opening 4h and a front wall 4e formed integrally with the mantle cover 4 prevent the leakage of light. At the four corners of the plane part of the cover 4, there are provided screw holes 4f. Further, the side parts 4g are formed so as to prevent light leakage at the projection gate 7, thus covering the gate part 7 when the mantle cover 4 is fixed on the projector body PB.

Figure 3:
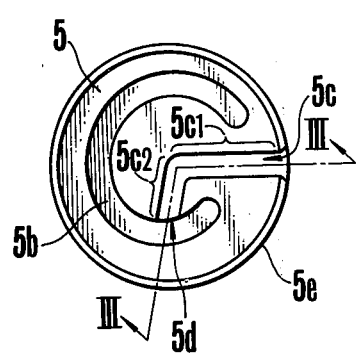
FIG. 3(a) is a front view of the adjusting member for the lens unit.
FIG. 3(b) is a perspective view of the member in FIG. 3(a) cut along the line III—III.
Figure 3:
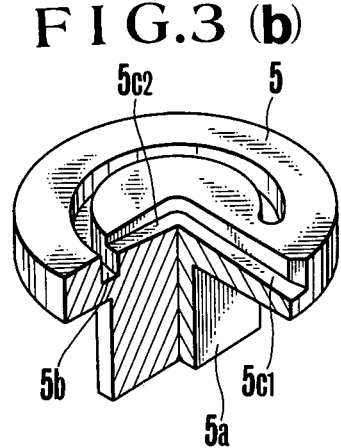

The adjusting member 5 has an operation handle 5a, an excentric cam groove 5b to effect focus adjustment upon the cam follower 2f, so as to adjust the construction holding frame 2 along the optical axis 0 as is shown in FIG. 3, and a guide groove 5c for introducing the cam follower 2f connect with the cam groove 5b via a stepped part 5d. When assembling the lens unit, the cam follower 2f of the above mentioned construction holding frame 2 can easily be introduced into the cam groove 5b. After introduction of the cam follower 2f, it can not easily escape out of the cam groove 5b. The guide groove 5c consists of a first guide part $5c_1$ and a second guide part $5c_2$ connected with the first guide part $5c_1$, making a certain determined angle with the guide part $5c_1$.

The above mentioned plate spring 6 has a ring-shaped plate spring part 6a for pressing the adjusting member 5 against the construction holding frame 2 so as to keep the engagement of the cam follower 2f in the cam groove 5b in the adjustment member 5. Spring 6 also has a tape-shaped plate spring part 6b for pressing the slide follower parts 2c and 2d against the guide rails 4a and 4b so as to keep the engagement of the slide follower parts 2c and 2d with the guide rails 4a and 4b formed on the mantle cover 4.

Figure 5:
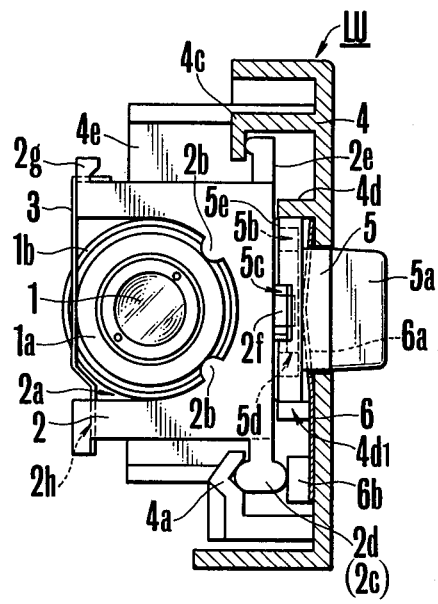
FIG. 5 is a rear view of the assembled lens unit.

Further, the section of the two slide follower parts 2c and 2d of the above mentioned construction holding frame 2 is, as is shown clearly in FIGS. 2 and 5, shaped nearly oval. The two guide rails 4a and 4b of the mantle cover 4 have a V-shaped groove so that at the time of assembling of the lens unit the construction holding frame 2 is positioned along the horizontal as well as the upwards and the downwards direction by means of the V-grooves of the guide rails 4a and 4b.

Figure 4:
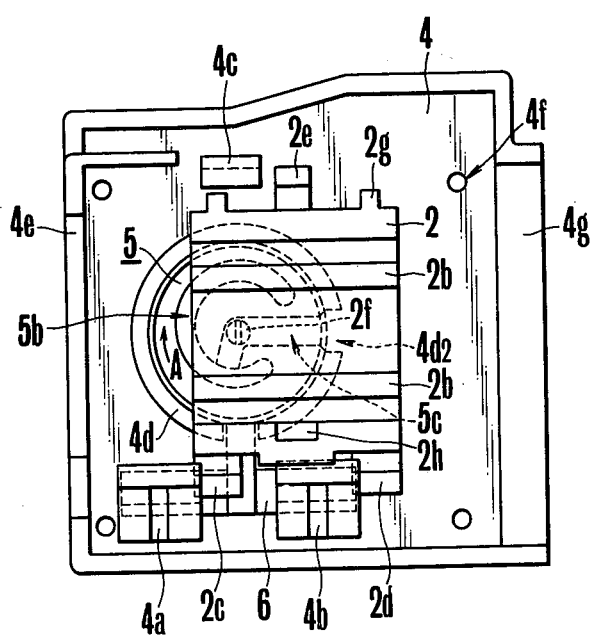
FIG. 4 shows the assembling sequence of the lens unit.

Cam follower 2f, as is shown in FIG. 4, has a slit along the lengthwise direction. The diameter of the foot of the cam follower 2f is a little larger than the width of the cam groove 5b of the adjusting member 5, so that in the assembled state the parts on both sides of the above mentioned slit of the cam follower 2f are pressed against the side walls of the cam groove 5b in such a manner that the cam follower 2f is kept in playless engagement in the cam groove 5b.

On a part of the ring-shaped wall 4d of the mantle cover 4, a notch $4d_1$ for receiving the head of the above mentioned plate spring 6 and another notch $4d_2$ for facilitating the introduction of the above mentioned cam follower 2f into the guide groove 5c at the time of the assembling of the lens unit are formed. The adjusting member 5 is in contact with the external circumstances of the construction holding frame 2 by means of the ring-shaped edge 5e. The handle 5a projects outwards through a circular opening 4h in the ring-shaped wall 4d in such a manner that the handle 5a can be manipulated from outside of the mantle cover 4.

The assembling sequence of the lens unit described above will now be explained.

The plate spring 6 is first mounted on the mantle cover 4 in such a manner that the ring-shaped plate spring 6a is inside of the ring-shaped wall 4d while the tape-shaped plate spring 6b is inside of the guide rails 4a and 4b. The adjusting member 5 is then brought inside of the ring-shaped wall 5d in such a manner that the opening of the first guide part $5c_1$ in the guide groove 5c coincides with the notch $4d_2$ in the ring-shaped wall 4d. At this time, the handle 5a of the adjusting member 5 projects outside of the mantle cover 4 through the circular opening 4h in the ring-shaped wall 4d so as to be operable from outside of the mantle cover 4.

While the handle 5a of the adjusting member 5 is being pulled outwards against the force of the plate spring 6, the construction holding frame 2 is introduced into the mantle cover 4 from behind. The cam follower 2f then engages the notch $4d_2$ in the ring-shaped wall 4d of the mantle cover 4 while the slide follower 2c engages the guide rail 4b.

At this time, the notch $4d_2$ in the ring-shaped wall 4d is lined up with the first guide part $5c_1$ in the guide groove 5c of the adjusting member 5 so that the cam follower 2f can be introduced into the first guide part $5c_1$ via the notch $4d_2$ until it reaches the end of the first guide part $5c_1$ when it strikes against the groove wall of the second guide part $5c_2$ so as to be unable to advance further (FIG. 4).

When the cam follower 2f has reached the end of the first guide part $5c_1$, the construction holding frame 2 is further advanced as the adjusting member 5 is rotated in the counter-clockwise direction (along the direction of the arrow A in FIG. 4) until the second guide part $5c_2$ of the adjusting member 5 is brought in parallel to the advance direction of the construction holding frame 2 (namely to the optical axis 0). The cam follower 2f then travels in the second guide part $5c_2$ so as to be introduced into the cam groove 5b to the focus adjustment via the stepped part 5d at the end. In this state, the slide followers 2c, 2d and 2e of the construction holding frame 2 are respectively engaged with the guide rails 4a, 4b and 4c. The followers 2c and 2d are pressed against the V-grooves in the guide rails 4a and by means of the tape-shaped plate spring 6b in such a manner that the construction holding frame 2 is positioned along the horizontal as well as the upwards the downwards direction. Further, as explained above, the guide groove 5c is connected to the cam groove 5b by means of the stepped part 5d (namely the cam groove 5b is formed deeper than the guide groove 5c). The cam follower 2f which has been introduced into the cam groove 5b is thus unable to travel from the cam groove 5b into the guide groove 5c unless the adjusting member 5 is pulled outwards against the force of the plate spring 6. The construction holding frame 2 can therefore be adjusted in position along the optical axis 0, being guided by the guide rails 4a, 4b and 4c in accordance with the amount of the excentricity of the cam groove 5b by the operation of the adjusting member 5.

In this way, after the construction holding frame 2 has been mounted on the mantle cover 4 together with the adjusting member 5, the plate spring 3 is fixed on the construction holding frame 2 by means of the abutment 2g and the slit 2h. The lens construction 1 is then brought into the concave part 2a in the construction holding frame 2. At this time, the lens construction 1 is fixed on the fixed external cylinder 1a by means of the plate spring 3, being centered by means of the standard rail 2b on the internal surface of the concave part 2a so that the focus adjustment can be carried out by means of the operation of the above mentioned adjustment member 5 while zooming adjustment can be carried out by means of the operation ring 1b.

Figure 6:
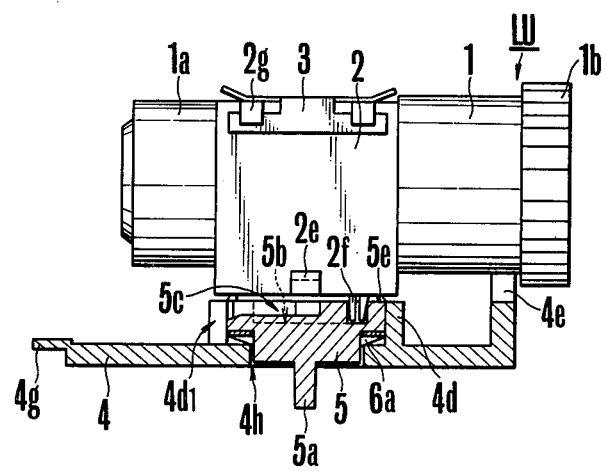
FIG. 6 is a top plan view of the assembled lens unit shown in FIG. 5.

FIGS. 5 and 6 show the lens unit LU in the assembled condition. The assembled lens unit LU is, as is shown in FIG. 1, fixed in front of the image projection gate part 7 of the motion projector body PB, being positioned by means of a screw 13. The optional alignment of the projection optical axis 0' of the projection lamp 11 and of the center of the projection aperture of the aperture plate 8 with the optical axis 0 of the lens construction 1 can correctly be maintained. The side edge 4g of the mantle cover 4 covers the image projection gate part 7 of the motion picture projector body PB so as to prevent light leakage at the gate part 7.

The use of an endless cam groove for effecting the focus adjustment with adjusting member 5 will now be explained.

Figure 7:
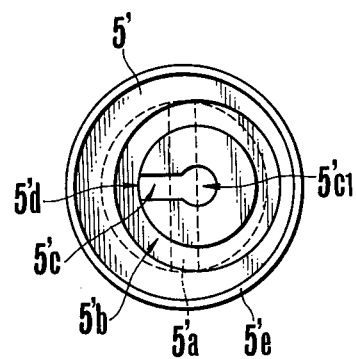
FIG. 7 illustrates another embodiment of the adjusting member for the unit in detail.

On the adjustment member 5' shown in FIG. 7, an endless excentric cam groove 5'b for the focus adjustment is formed together with the handle 5'a for operation and the ring-shaped edge 5'e, whereby inside of the cam groove 5'b a guide groove 5'c for introducing the follower, having a part with a large diameter at the end is connected to the cam groove 5'b via the stepped part 5'd.

Figure 8:
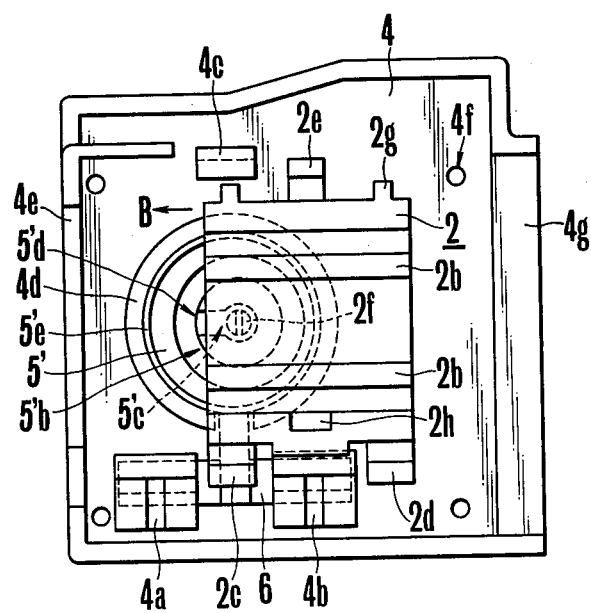
FIG. 8 shows an example of the assembling procedure of the unit using the adjusting member shown in FIG. 7.

FIG. 8 shows the assembling sequence of the lens unit in which an adjusting member 5' having an endless cam groove 5'c is used. In the same way as in case of the previous embodiment, the adjustment member 5' is first brought inside of the ring-shaped wall 4d of the mantle cover 4 together with the plate spring 6 in such a manner that the guide groove 5'c is parallel to the optical axis 0. The construction holding frame 2 is then mounted on the adjustment member 5'. The cam follower 2f is then introduced into the part with a large diameter at the end of the guide groove 5'c. As shown in FIG. 8 the construction holding frame 2 is provided toward the mantle cover 4 in such a manner that the slide follower 2c is situated between the guide rails 4a and 4b. When the construction holding frame 2 is advanced along the direction of the arrow B, with reference to the mantle cover 4, while the adjusting member 5' is pulled outwards against the force of the plate spring 6, the cam follower 2f, is guided along the guide groove 5'c, and falls into the cam groove 5'b through the stepped part 5'd. The slide follower 2c, 2d and 2e respectively engage the guide rails 4a, 4b and 4c in such a manner that the construction holding frame 2 is adjustably held by the mantle cover 4. In the same way as in case of the previous embodiment the assembling of the unit is completed by fixing the lens construction 1 on the construction holding frame 2 by means of the plate spring 3.

As explained above in detail in accordance with the present invention, the lens unit dismountable for the motion picture projector body is constituted with the projection lens construction, the construction holding frame for fixedly holding the lens construction, the mantle cover for containing the lens construction being fixed on the projector body so as to hold the construction holding frame adjustable in position along the optical axis of the above mentioned lens construction and the adjusting member for effecting focus adjustment being provided on the mantle cover so as to be operable for adjusting the position of the above mentioned construction holding frame along the above mentioned optical axis. As compared with the conventional projector the efficiency of assembling is remarkably improved while the construction is suited for mass production so that it is quite effective for lowering the cost of the projectors. Thus it is quite profitable to apply the construction to the normal projector body, avoiding any increase in the size of the body.

Further, the motion picture projection lens construction is merely fixedly held by means of the construction holding frame so that it can easily be dismounted, which is very convenient for the ordinary users. With the construction holding frame provided with the cam follower and the adjusting member provided with the cam groove, and with the guide groove for introducing the follower connected to the cam groove via a stepped part so as to facilitate the introduction of the cam follower into the cam groove and to prevent the escape of the cam follower out of the cam groove after introduction into the cam groove, the assembling of the unit itself becomes easy while the assembling efficiency is much improved, which is very profitable.

Although in the case of the present invention, a cam follower pin is provided on the construction holding frame, while the adjusting member is provided with the cam groove and the guide groove, it is also possible that the construction holding frame be provided with the cam groove and the guide groove while the adjusting member be provided with the cam follower pin.

Further, with reference to the relation of the guide groove to the cam groove provided on the adjusting member, the cam groove is formed deeper than the guide groove at the boundary between the guide groove and the cam groove, whereby a stepped part is formed at the boundary between the guide groove and the cam groove in such a manner that the cam follower pin introduced into the cam groove via the guide groove can not be brought back into the guide groove again. However it is not always necessary to form a stepped part at the boundary between the guide groove and the cam groove by forming the cam groove deeper than the guide groove. If a projecting part is provided at the boundary between the cam groove and the guide groove even if the cam groove is formed as deep as the guide groove, the cam follower pin runs over the projecting part into the cam groove when the cam follower pin is guided into the cam groove through the guide groove never to be brought back out of the cam groove into the guide groove, being prevented by means of the projecting part.

What is claimed is:

1. A construction of a lens device for a motion picture projector comprising:
    (a) a motion picture projection lens construction,
    (b) a construction holding means for fixedly holding the lens construction,
    (c) an adjustment means for moving the construction holding means for focusing adjustment of the lens construction,
    (d) guide means permitting movement of said construction holding means by said adjusting means in such a manner that the optical system of the lens construction moves along the optical axis, whereby said construction holding means and said adjusting means form a unit in such a manner that the construction holding means and the adjusting means can be treated as one body and can be operated independently, and
    (e) means for cooperatively coupling the construction holding means with the adjusting means, comprising
        (1) a cam follower provided on either said construction holding means or said adjusting means,
        (2) a cam groove on the other of said means in which said cam follower is engaged, and,
        (3) an engagement means for facilitating the introduction of said cam follower into said cam groove at the time of assembling the construction holding means and the adjusting means into one unit and for prohibiting the cam from escaping out of the cam groove after introduction into the cam groove.

2. A construction of a lens device for a motion picture projector in accordance with claim 1, wherein the engagement means includes:
    a projecting part provided in the path along which the cam follower is led into the cam groove, in such a manner that it projects from the bottom of the cam groove immediately before the position at which the cam follower is engaged into the cam groove, and
    urging means for urging the construction holding means and the adjusting means against each other in such a manner that the cam follower means and the cam groove are normally in contact with each other.

3. A construction of a lens device for a motion picture projector in accordance with claim 1, wherein the engagement means includes:
    a guide groove for facilitating the introduction of the cam follower into the cam groove, said guide groove being connected with the cam groove, said cam groove being deeper than said guide groove, and
    an urging means for urging the construction holding means and the adjusting means against each other so that the cam follower means and the cam groove are normally in contact with each other.

4. A construction of a lens device for a motion picture projector in accordance with claim 3, wherein the construction holding means includes a follower part to be engaged in a guide part of the adjustment means, said urging means exercising an urging force in a direction to maintain said guide part and said follower part in contact with each other.

5. A construction of a lens device for a motion picture projector in accordance with claim 4, wherein the urging means is provided between the construction holding means and the adjustment means.

6. A construction of a lens device for a motion picture projector in accordance with claim 1, wherein the construction holding means includes:
    a construction holding frame having a holding part for holding the lens construction,
    an urging means selectively mountable on and dismountable from the construction holding frame in such a manner that when it is mounted it exercises an urging force for fixedly and elastically holding the lens construction in the construction holding frame by pressing the lens construction against the construction holding frame, while when it is dismounted the lens construction can easily be separated from the construction holding frame.

7. A construction of a lens device for a motion picture projector comprising:
    (a) a motion picture projection lens construction,
    (b) a construction holding means for fixedly holding the lens construction,
    (c) an adjusting means for moving the construction holding means so as to adjust the focus of the lens construction, (d) guide means permitting movement of said construction holding means by said adjusting means in such a manner that the optical system of the lens construction moves along the optical axis, whereby said construction holding means and the adjusting means form a unit in such a manner that the construction holding means and the adjusting means can be treated as one body and can be operated independently;

(e) means for cooperatively coupling the construction holding means and the adjusting means with each other, comprising:

(1) a cam follower pin provided on the construction holding means, (2) a cam groove for effecting focus adjustment provided in said adjusting means, said cam follower pin being engaged in said cam groove so that said construction holding means is moved by means of the cam follower pin when the adjusting means is operated, (3) a guide groove provided in the construction holding means and connected with the cam groove so as to facilitate introduction of the cam follower pin into the cam groove at the time of assembling the construction holding means and adjusting means into said unit and to prohibit the cam follower pin from escaping out of the cam groove after introduction into the cam groove, the cam groove being deeper than said guide groove, and (f) an urging means provided on said adjustment for urging the construction holding means and the adjusting means against each other so as to maintain the cam follower pin and the cam groove normally in contact with each other.

8. A motion picture projector having a motion picture projection lens device comprising:

(a) a motion picture projector body having a mounting part on which the motion picture projection lens device is mounted, (b) the motion picture projection lens device including a motion picture projection lens construction, a device base plate to be fixed on the mounting part of the projector body, a construction holding means for fixedly holding the lens construction, said means having a cam follower pin, a guide means for holding the construction holding means on the device base plate so as to enable the movement of the construction holding means only along the optical axis of the optical system, said means fixed on the device base plate, an adjusting means for causing sliding movement of the construction holding means, said adjusting means being rotatably supported with the device base plate and including:

a cam groove in which the cam follower pin is engaged, a guide groove connected to the cam groove via a stepped part for facilitating the introduction of the cam follower pin of the construction holding means into the cam groove at the time of the engagement of the cam follower pin into the cam groove and prohibiting the cam follower pin from escaping out of the cam groove after the introduction into the cam groove, a means for manually operating the adjusting means from outside of the device, said means having an operation member connected to the adjusting means and extending through the device base plate, and an urging means provided on the device base plate for urging the construction holding means and the adjusting means against each other so as to maintain the cam follower pin and the cam groove normally in contact with each other.

9. A motion picture projector having a motion picture projection lens device in accordance with claim 8, wherein the urging means comprises a spring member provided between the device base plate and the adjusting means, said spring member exercising a force for urging the adjusting member against the construction holding means.

10. A motion picture projector having a motion picture projection lens device in accordance with claim 8, wherein the cam groove and the guide groove in the adjusting means are connected to each other, said cam groove being deeper than the guide groove.

11. A motion picture projector having a motion picture projection lens device in accordance with claim 8, wherein the cam groove is formed so as to describe an eccentric circle to cause reciprocating sliding movement of the construction holding device via the cam follower means when the adjusting device is rotated along the same direction.

12. A motion picture projector having a motion picture projection lens device in accordance with claim 8, wherein when the device base plate is mounted on the motion picture projector body, a part of the device base plate covering an image projection gate part of the motion picture projector body so as to prevent leakage of light at the gate part.

13. A motion picture projector having a motion picture projection lens device in accordance with claim 8, wherein the construction holding means comprises:

a construction holding frame having a holding part for holding the lens construction, and an urging means selectively mountable on and dismountable from the construction holding frame in such a manner that when it is mounted it exercises an urging force for fixedly and elastically holding the lens construction in the construction holding frame by pressing the lens construction against the construction holding frame, and when it is dismounted the lens construction can easily be separated from the construction holding frame.

* * * * *